US011042166B2

(12) United States Patent
Ohta

(10) Patent No.: US 11,042,166 B2
(45) Date of Patent: Jun. 22, 2021

(54) SHOCK ABSORBABLE FLYING DEVICE, METHOD OF FLYING THE SAME, AND RECORDING MEDIUM

(71) Applicant: CASIO COMPUTER CO., LTD, Tokyo (JP)

(72) Inventor: Masanori Ohta, Akishima (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 337 days.

(21) Appl. No.: 16/135,706

(22) Filed: Sep. 19, 2018

(65) Prior Publication Data

US 2019/0092457 A1 Mar. 28, 2019

(30) Foreign Application Priority Data

Sep. 22, 2017 (JP) .............................. JP2017-181895

(51) Int. Cl.
*B64C 1/30* (2006.01)
*G05D 1/10* (2006.01)
*B64C 39/02* (2006.01)
*B64C 27/00* (2006.01)
*B64C 39/00* (2006.01)

(52) U.S. Cl.
CPC ............... *G05D 1/101* (2013.01); *B64C 1/30* (2013.01); *B64C 27/006* (2013.01); *B64C 39/00* (2013.01); *B64C 39/024* (2013.01); *B64C 2201/027* (2013.01); *B64C 2201/108* (2013.01)

(58) Field of Classification Search
CPC ........... B64C 1/30; B64C 27/006; B64C 3/56; B64C 27/50
See application file for complete search history.

(56) References Cited

U.S. PATENT DOCUMENTS

| 8,500,067 | B2 * | 8/2013 | Woodworth | B64D 1/14 |
| | | | | 244/120 |
| 9,783,294 | B2 * | 10/2017 | Johannesson | B64C 27/08 |
| 9,914,537 | B2 * | 3/2018 | Wu | B64C 1/30 |
| 10,106,252 | B1 * | 10/2018 | Tearne | A63H 27/12 |
| 10,118,697 | B2 * | 11/2018 | Weissenberg | B64C 39/024 |
| 10,766,599 | B2 * | 9/2020 | Zheng | B64D 47/08 |
| 2013/0175390 | A1 * | 7/2013 | Woodworth | B64C 1/30 |
| | | | | 244/54 |

(Continued)

FOREIGN PATENT DOCUMENTS

| JP | H05-335996 A | 12/1993 |
| JP | H06-156394 A | 6/1994 |

(Continued)

OTHER PUBLICATIONS

JPO; Application No. 2017-181895; Notice of Reasons for Refusal dated Jul. 2, 2019.

*Primary Examiner* — Joseph W Sanderson
(74) *Attorney, Agent, or Firm* — Fitch, Even, Tabin & Flannery LLP

(57) ABSTRACT

A flying device includes a propulsion unit, a restrictor and a releaser. The propulsion unit flies the flying device in air. The restrictor restricts the propulsion unit in an open state from rotating more than a predetermined angle during flight of the flying device, the propulsion unit in the open state being rotated from a closed state by the predetermined angle. The releaser releases a restriction by the restrictor.

18 Claims, 4 Drawing Sheets

(56) References Cited

U.S. PATENT DOCUMENTS

| | | | |
|---|---|---|---|
| 2015/0259066 A1* | 9/2015 | Johannesson | B64C 1/30 244/17.27 |
| 2017/0043870 A1* | 2/2017 | Wu | B64D 47/08 |
| 2017/0085840 A1* | 3/2017 | Mizushina | H04N 5/2257 |
| 2017/0313401 A1* | 11/2017 | Tang | B64C 39/024 |
| 2018/0201356 A1* | 7/2018 | Cai | B64C 39/024 |
| 2018/0304984 A1* | 10/2018 | Zheng | B64C 1/30 |
| 2019/0009876 A1* | 1/2019 | Toyama | B64B 1/30 |
| 2019/0193844 A1* | 6/2019 | Zheng | B64C 1/30 |

FOREIGN PATENT DOCUMENTS

| | | |
|---|---|---|
| JP | 2000-052832 A | 2/2000 |
| JP | 2008-089754 A | 4/2008 |
| JP | 3199308 U | 8/2015 |
| JP | 2017-056921 A | 3/2017 |
| WO | 2017/154551 A1 | 9/2017 |

\* cited by examiner

SHOCK ABSORBABLE FLYING DEVICE, METHOD OF FLYING THE SAME, AND RECORDING MEDIUM

CROSS-REFERENCE TO RELATED APPLICATIONS

This application is based upon and claims the benefit of priority from the prior Japanese Patent Application No. 2017-181895, filed on Sep. 22, 2017, the entire contents of which are incorporated herein by reference.

BACKGROUND OF THE INVENTION

1. Field of the Invention

The present invention relates to a technique of absorbing shock applied to a flying device flying in air.

2. Description of the Related Art

For example, JP2017-056921A discloses a small unmanned flying device referred to as a "drone".

SUMMARY OF THE INVENTION

To achieve at least one of the abovementioned objects, according to a first aspect of the present invention, a flying device includes:
a propulsion unit which flies the flying device in air;
a restrictor which restricts the propulsion unit in an open state from rotating more than a predetermined angle during flight of the flying device, the propulsion unit in the open state being rotated from a closed state by the predetermined angle; and
a releaser which releases a restriction by the restrictor.

According to a second aspect of the present invention, a method of flying a flying device comprising a propulsion unit includes steps of:
restricting the propulsion unit in an open state from rotating more than a predetermined angle during flight of the flying device, the propulsion unit in the open state being rotated from a closed state by the predetermined angle; and
releasing a restriction.

According to a third aspect of the present invention, a recording medium stores a program executed to instruct a computer of a flying device comprising a propulsion unit, to function as:
a restrictor which restricts the propulsion unit in an open state from rotating more than a predetermined angle during flight of the flying device, the propulsion unit in the open state being rotated from a closed state by the predetermined angle; and
a releaser which releases a restriction by the restrictor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, one or more embodiments of the present invention will be described with reference to the drawings. However, scope of the invention is not limited to the disclosed embodiments.

Figure 1A:
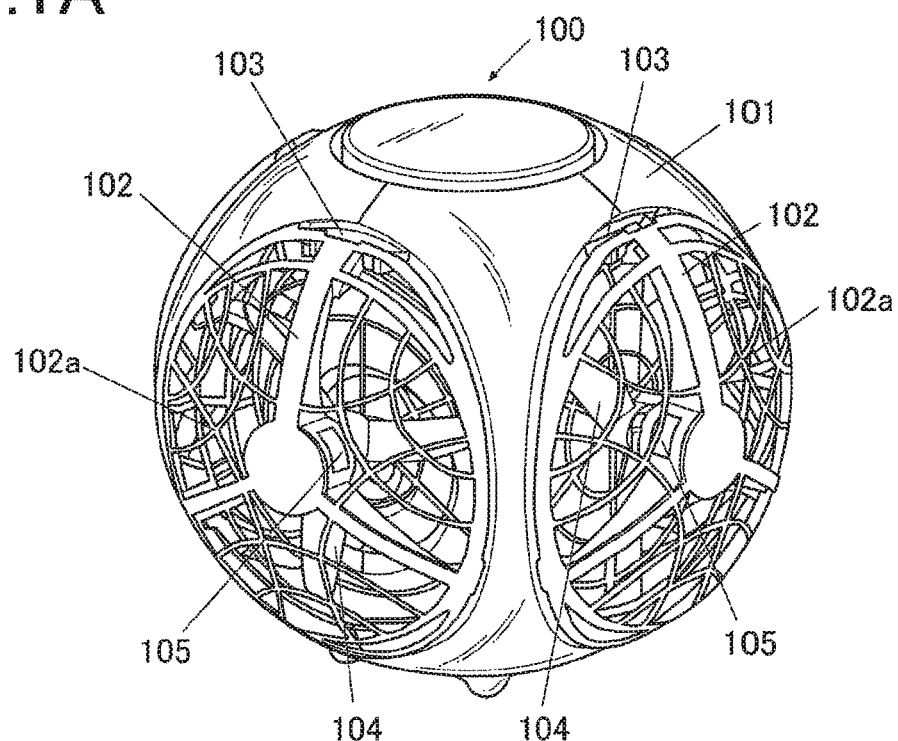
FIG. 1A is an external view of a flying device with motor frames that are closed according to an embodiment of the present invention.
Figure 1B:
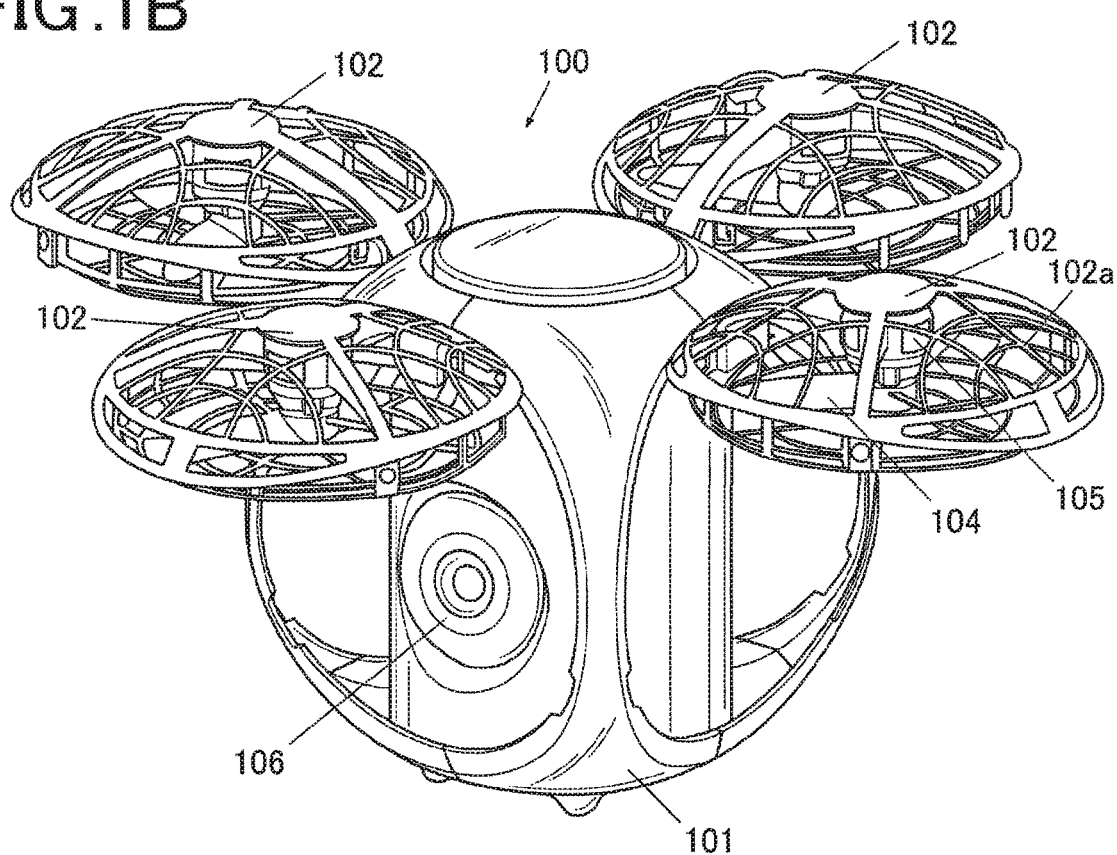
FIG. 1B is an external view of the flying device with the motor frames that are open.

FIGS. 1A and 1B are external views of a flying device 100 according to an embodiment of the present invention. In detail, FIG. 1A is an external view of a spherical exterior of the flying device 100 with motor frames 102 that are closed. FIG. 1B is an external view of the flying device 100 with the motor frames 102 that are open.

As shown in FIGS. 1A and 1B, the flying device 100 includes a main frame 101 and four motor frames (rotors) 102.

The motor frames 102 are attached to the main frame 101 with hinges 103. The motor frames 102 support respective motors 105. Rotor blades 104 are fixed to motor shafts of the respective motors 105. Finger guards 102a are provided on peripheral portions of the motor frames 102. Four motors 105, four rotor blades 104, and four motor drivers 404 (described below) constitute a propulsion unit.

A camera (image capturing unit) 106 is fixed to a central portion of the main frame 101. The main frame 101 accommodates control units illustrated in FIG. 2.

The hinges 103 are each rotatable within a range of 0 to 90 degrees (predetermined angle) such that the motor frames 102 can change between the "closed mode" suitable for launching of the flying device 100 illustrated in FIG. 1A and the "open mode" suitable for flight of the flying device 100 illustrated in FIG. 1B. In specific, restrictors 107 (described below) are provided on the main frame 101 to restrict the respective motor frames 102 from rotating more than 90 degrees from the open position, which is a position at 90 degrees from the closed position.

Figure 2:
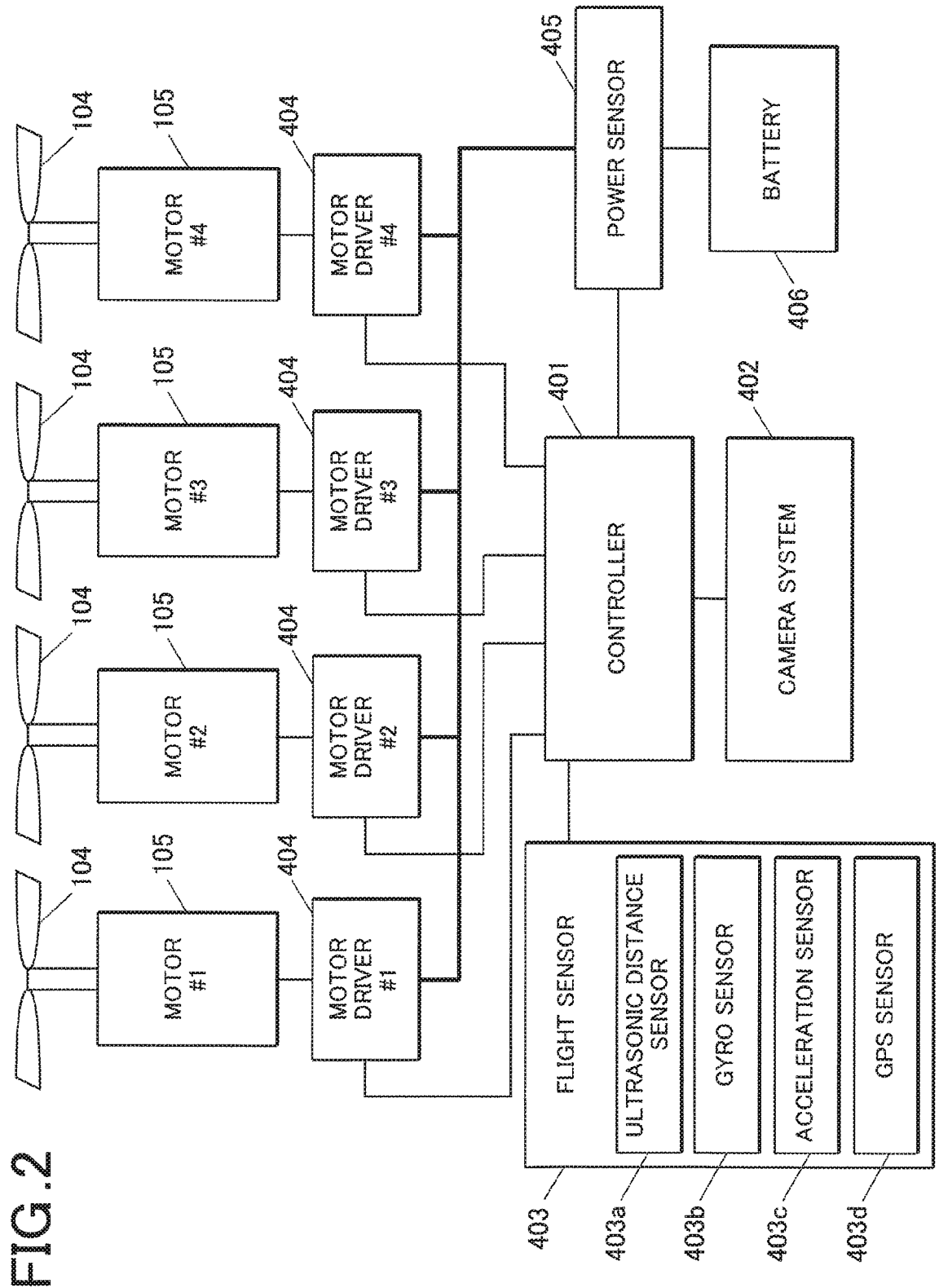
FIG. 2 illustrates an example of system configuration of the flying device.

FIG. 2 illustrates an example of system configuration of the flying device 100.

With reference to FIG. 2, a controller 401 including, for example, a computer or a CPU (not shown) is connected to a camera system 402 including a camera 106 (see FIG. 1B); a flight sensor 403 including an ultrasonic sensor 403a that measures a distance from the flying device 100 to a reference plane (a relative altitude of the flying device 100), a gyro sensor 403b that detects a tilt of the flying device 100, an acceleration sensor 403c, and a global positioning system (GPS) sensor 403d that determines a position of the flying device 100; first to fourth motor drivers 404 that drive first to fourth motors 105, respectively (see FIGS. 1A to 1B); and a power sensor 405 that feeds power to the motor drivers 404 while monitoring a voltage of a battery 406. Although not illustrated, the power of the battery 406 is also fed to the control units 401 to 405. The controller 401 receives information on the altitude and an orientation of the flying device 100 from the flight sensor 403 in real time. The controller 401 monitors the voltage of the battery 406 with the power sensor 405 and sends power instruction signals corresponding to duty ratios based on pulse-width modulation to the motor drivers 404. This controls a rotational rate of the motors 105 of the respective motor drivers 404. The controller 401 controls the camera system 402 to control an image capturing operation of the camera 106 (see FIG. 1B).

The operation from a start to an end of the flight of the flying device 100 will now be explained.

The flying device 100 can have two different modes of the motor frames 102: the "closed mode" illustrated in FIG. 1A suitable for the launching of the flying device 100 and the "open mode" illustrated in FIG. 1B suitable for the flight of the flying device 100. A user can launch the flying device 100 in the "closed mode" into air. When the flying device 100 starts to reduce its altitude under control by the controller 401 shown in FIG. 2, the motors 105 are driven to rotate the rotor blades 104 and generate lift. This causes the flying device 100 to enter the "open mode". When the flying device 100 reaches a flight mode at a predetermined target altitude (for example, two meters from ground or a reference plane), the camera 106 can capture images. Stopping the motors 105 under the control by the controller 401 to end the flight causes the flying device 100 to enter the "closed mode" in which the motor frames 102 are stored in the main frame 101 and end the flight.

An operation of the restrictors 107 provided on the main frame 101 will now be explained with reference to FIGS. 3A, 3B, and 4.

Figure 3A:
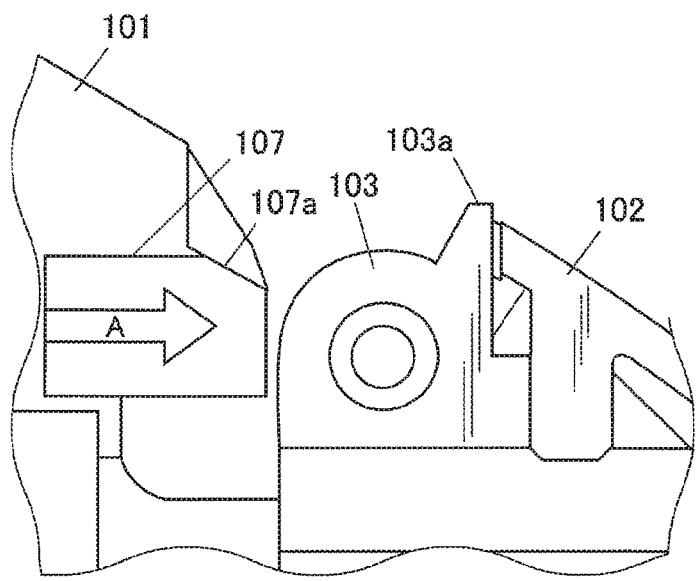
FIG. 3A is an enlarged schematic view of a hinge of the flying device and vicinity when the motor frames are in a "closed mode".

FIG. 3A is an enlarged schematic view of one of the hinges 103 of the flying device 100 and vicinity when the corresponding motor frame 102 is closed or in the "closed mode".

The restrictors 107 are disposed near the respective hinges 103. As illustrated in FIG. 3A, each restrictor 107 has a contact face 107a that engages with a protrusion 103a of the corresponding hinge 103. The restrictor 107 is provided with a biasing spring (not shown) that generates a biasing force in a direction of arrow A to restrict the movement in the direction opposite to the biasing direction or the direction of arrow A of the biasing spring. A spring constant of the biasing spring is adjusted such that the biasing spring is biased in the direction opposite to the biasing direction (the direction of arrow A) when the biasing spring receives a load (for example, a force generated when the flying device 100 falls with the motor frames 102 in the closed state and collides with the ground or an object) greater than or equal to a magnitude of the lift generated by the rotation of the rotor blades 104.

Figure 3B:
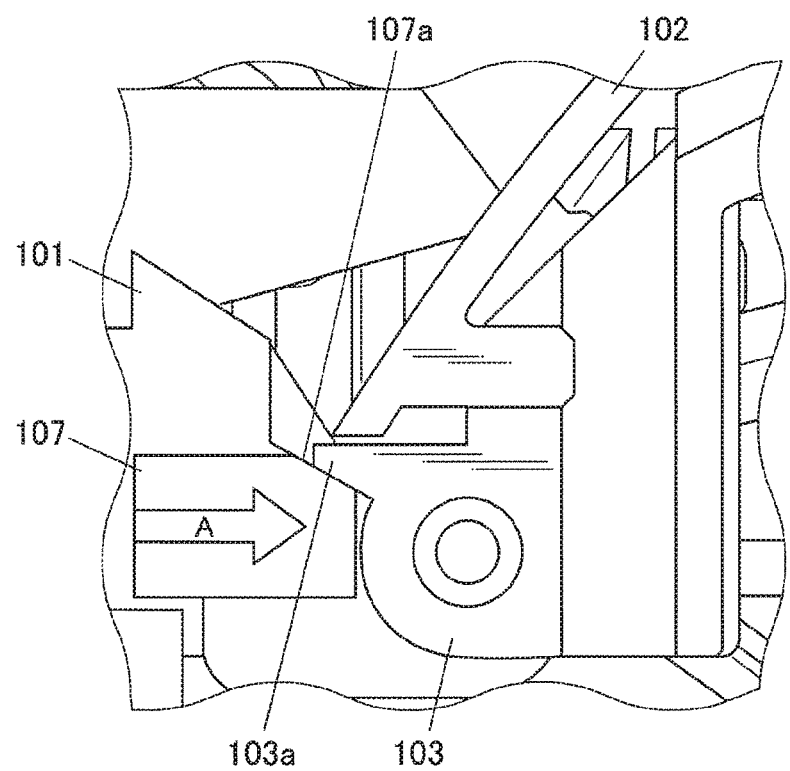
FIG. 3B is an enlarged schematic view of the hinge of the flying device and the vicinity when the motor frames are in an "open mode".

FIG. 3B is an enlarged schematic view of one of the hinges 103 of the flying device 100 and the vicinity when the motor frames 102 are open or in the "open mode".

With reference to FIG. 3B, when the motor frames 102 rotate by 90 degrees from the "closed mode" to the "open mode", the protrusions 103a of the hinges 103 come into contact with the contact faces 107a of the respective restrictors 107 and restrict the respective motor frames 102 from rotating more than 90 degrees.

Figure 4:
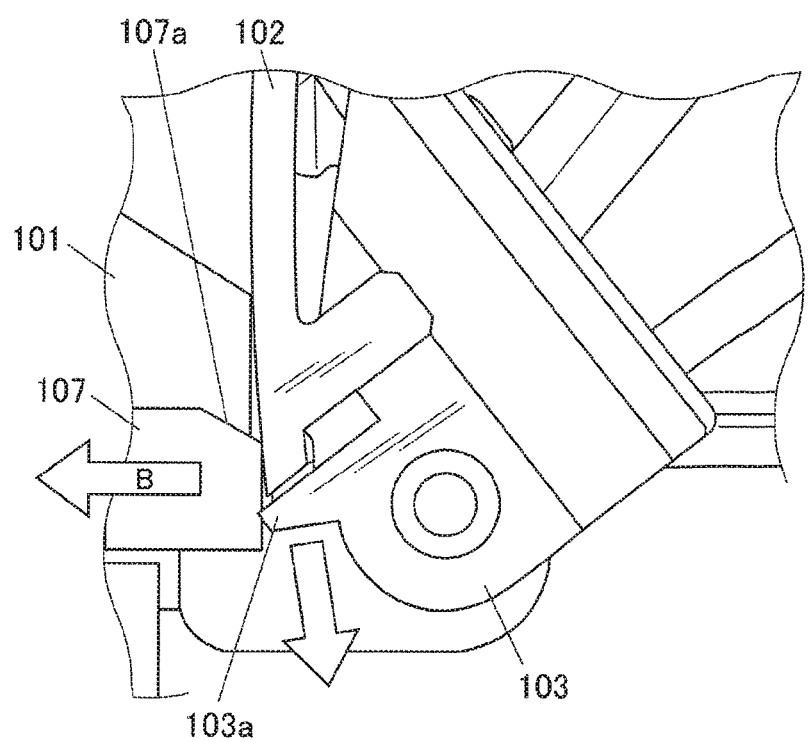
FIG. 4 is an enlarged schematic view of the hinge of the flying device and the vicinity when the flying device falls and the motor frames collide with ground or an object.

FIG. 4 is an enlarged schematic view of one of the hinges 103 of the flying device 100 and the vicinity at collision of the motor frames 102 with the ground or the object, for example, as a result of a fall of the flying device 100 caused by a loss of flight control during the flight.

If any of the motor frames 102 receive an external force greater than or equal to a threshold value (greater than or equal to the magnitude of the lift) and rotate more than 90 degrees as a result of a collision with the ground or the object due to the fall of the flying device 100, the contact face 107a of the corresponding restrictor 107 is biased by the protrusion 103a of the corresponding hinge 103, causing the restrictor 107 to retreat in a direction of arrow B, as illustrated in FIG. 4. This allows the corresponding motor frame 102 to rotate more than 90 degrees and absorb a shock of the collision with the ground or the object. In specific, the restrictors (restrictors, releasers) 107 and the biasing springs (restrictors, releasers) restrict the respective motor frames 102 from rotating more than 90 degrees in the open state, which is a state entered by rotating the motor frames 102 by 90 degrees from the closed state during the flight of the flying device 100, whereas the restrictor 107 and the biasing springs release the restriction of the motor frames 102 in response to the external force greater than or equal to the threshold value (greater than or equal to the magnitude of the lift) that causes the motor frames 102 to rotate more than 90 degrees.

As described above, the flying device 100 according to this embodiment includes the motor frames 102, the motors 105, the rotor blades 104, and the motor drivers 404, which constitute a propulsion unit that flys the flying device; and the restrictors 107 and the biasing springs that (i) restrict the respective motor frames 102 from rotating more than 90 degrees in the open state in which the motor frames 102 are rotated by 90 degrees from the closed state during the flight of the flying device 100, and (ii) release the restriction of the motor frames 102 in response to the external force greater than or equal to the threshold value (greater than or equal to the magnitude of the lift) that causes the motor frames 102 to rotate more than 90 degrees.

For example, when the flying device 100 according to this embodiment falls and the motor frames 102 collide with the ground or the object, the restriction by the restrictors 107 is released as the result of the contact faces 107a of the restrictors 107 being biased by the protrusions 103a of the respective hinges 103. This allows the motor frames 102 to rotate more than 90 degrees and absorb the shock of the collision with the ground or the object. This prevents damage to the motor frames 102 and the rotor blades 104 of the motor frames 102.

Modification

The flying device 100 may include actuators (not shown) in place of the biasing springs, which serve as the restrictors or the releasers. The actuators slide the respective restrictors 107 between a first position and a second position. In the first position, a contact face 107a of the restrictor 107 is not engaged with the protrusion 103a of the corresponding hinge 103. In the second position, the contact face 107a of the restrictor 107 is engaged with the protrusion 103a of the corresponding hinge 103.

In detail, the actuators are driven to slide the respective restrictors 107 to the second position such that the respective motor frames 102 are prevented from rotating more than 90 degrees in the open state of the motor frames 102, which is a state entered by rotating the motor frames 102 by 90 degrees from the closed state during flight of the flying device 100, whereas the actuators are activated to slide the respective restrictors 107 to the first position when the motor frames 102 receive the external force greater than or equal to the threshold value (greater than or equal to the magnitude of the lift) that causes the motor frames 102 to rotate more than 90 degrees. In more detail, the controller 401 instructs the gyro sensor 403b to detect the tilt of the flying device 100 during the flight. If a continuous tilt in a certain direction for a predetermined time (for example, five seconds) is detected, the motor frame 102 in the direction of the tilt is detected as a target motor frame 102 (a rotor) receiving the external force greater than or equal to the threshold value among the motor frames 102. The controller 401 instructs the corresponding actuator to be driven to slide the restrictor 107 restricting the target motor frame 102 to the first position.

In the flying device 100 according to this modification, the target motor frame 102 (the rotor) receiving the external force greater than or equal to the threshold value is detected among the motor frames 102 and the restrictor 107 restricting the target motor frame 102 (the rotor) slides to the first position to release the restriction by the restrictor 107, for example, during the fall of the flying device 100. Thus, the target motor frame 102 can rotate more than 90 degrees and absorb the shock of the collision with the ground or the object. This prevents damage to the motor frames 102 and the rotor blades 104 provided on the motor frames 102.

The embodiments should not be construed to limit scope of the invention and may be modified within the scope of the invention.

In the embodiment described above, the biasing springs serve as the restrictors or the releasers. Alternatively, any elastic member, such as rubber, may serve as the restrictors or the releasers.

For example, the controller 401 may control any number, besides four, of the motors 105, the rotor blades 104, and the motor drivers 404 to fly the flying device 100. For example, the controller 401 may control at least one motor 105, at least one rotor blade 104, and at least one motor driver 404.

In the embodiment described above, the flying device 100 measures the distance from the flying device 100 to the reference plane (the altitude) with the ultrasonic sensor 403a. Alternatively, the flying device 100 may include a laser sensor and determine the distance from the flying device 100 to the reference plane (the altitude) on the basis of the values output from the laser sensor.

In the embodiment described above, the restriction of the motor frame 102 is released when the motor frame 102 receives the external force greater than or equal to the threshold value (greater than or equal to the magnitude of the lift) that causes the motor frame 102 to rotate more than 90 degrees. Alternatively, the motor frame 102 may enter the closed state just before receiving the external force. This absorbs the shock applied to the motor frames 102 and the rotor blades 104 provided on the motor frames 102.

In the flying device 100 according to the embodiment described above, the controller 401 including the computer or the CPU executes programs stored in the ROM (not shown) to control components such as the propulsion unit, the restrictor, the releaser, the detector, the image capturing unit, and the flight sensor. Alternatively, the flying device 100 according to the present invention may include an application specific integrated circuit (ASIC), a field-programmable gate array (FPGA), or dedicated hardware, such as various control circuits, in place of the CPU, and the dedicated hardware may control the propulsion unit, the restrictor, the releaser, the detector, the image capturing unit, and the flight sensor. In such a case, the components may be controlled by individual hardware units or controlled comprehensively by a single hardware unit. Alternatively, some of the components may be controlled by a dedicated hardware unit and the other components may be controlled by software or firmware.

A flying device may be provided with a configuration that establishes the control according to the present invention. Alternatively, a program may be executed to instruct a conventional information processor to function as the flying device according to the present invention. In specific, a program for establishing the controls by the flying device 100 according to the embodiments described above may be executed by a CPU controlling the conventional information processor to instruct the conventional information processor to function as the flying device according to the present invention.

Such the program may be applied in any way. The program to be applied, for example, may be stored in a computer readable recording medium, such as a flexible disc, a compact disc ROM (CD-ROM), a digital versatile disc ROM (DVD-ROM), or a memory card. Alternatively, the program may be superposed onto carrier waves and used through a communication medium, such as the Internet. For example, the program may be posted on a bulletin board system (BBS) on a communication network for distribution. Alternatively, the program may be started under the control of an operating system (OS) and executed in a manner similar to other application programs, to achieve the control described above.

The embodiments described above should not be construed to limit the present invention, and the claims and other equivalents thereof are included in the scope of the invention.

What is claimed is:

1. A flying device comprising:
   a propulsion unit which flies the flying device in air; and
   a restrictor which (i) restricts the propulsion unit in an open state from rotating more than a predetermined angle during flight of the flying device, the propulsion unit in the open state being rotated from a closed state by the predetermined angle and (ii) releases a restriction on the propulsion unit.

2. The flying device according to claim 1, wherein the restrictor releases the restriction when or before the propulsion unit receives an external force greater than or equal to a threshold value that causes the propulsion unit to rotate more than the predetermined angle in a case in which the propulsion unit is restricted by the restrictor.

3. The flying device according to claim 2, wherein
   the propulsion unit comprises a plurality of rotors,
   the flying device further comprises a detector which detects a rotor receiving the external force greater than or equal to the threshold value among the plurality of rotors of the propulsion unit, and
   the restrictor releases the restriction of the rotor detected by the detector.

4. The flying device according to claim 2, wherein,
   the propulsion unit comprises a plurality of rotors,
   the threshold value equals a magnitude of lift generated by the rotation of the rotors, and
   the external force equals the force generated by a collision of the propulsion unit with an object after a fall of the flying device with the propulsion unit in the open state.

5. The flying device according to claim 4, wherein the object comprises ground.

6. The flying device according to claim 1, wherein the restrictor releases the restriction in a case in which the flying device in the air falls.

7. The flying device according to claim 1, wherein,
the propulsion unit comprises a plurality of rotors,
the propulsion unit rotates the rotors to generate lift and changes the rotors from the closed state to the open state when a user launches the flying device into the air, and
the propulsion unit stops rotation of the rotors and changes the rotors from the open state to the closed state in order to stop the flight of the flying device.

8. The flying device according to claim 1, wherein,
the restrictor comprises a restricting member and restricts the propulsion unit from rotating more than the predetermined angle by shifting the restricting member from a first position to a second position and engaging the restricting member with the propulsion unit, and
the restrictor releases the restriction by shifting the restricting member from the second position to the first position to disengage the restricting member from the propulsion unit and to allow the propulsion unit to rotate more than the predetermined angle.

9. The flying device according to claim 1, wherein,
the propulsion unit comprises a plurality of rotors, and
the propulsion unit changes the rotors to the open state and flies the flying device at a predetermined altitude from a reference plane.

10. The flying device according to claim 1, further comprising:
an image capturing unit which captures images,
the image capturing unit comprising a camera system comprising a camera.

11. The flying device according to claim 1, further comprising:
a flight sensor which measures a position, an altitude, or a tilt of the flying device, wherein
the flight sensor which measures the position of the flying device comprises a GPS sensor,
the flight sensor which measures the altitude of the flying device comprises an ultrasonic sensor or a laser sensor, and
the flight sensor which measures the tilt of the flying device comprises a gyro sensor or an acceleration sensor.

12. The flying device according to claim 11, wherein,
the propulsion unit comprises a plurality of rotors, and
in a case in which the tilt is continuously detected in a certain direction for a predetermined time by the gyro sensor or the acceleration sensor, the detector detects a rotor in the direction of the tilt among the rotors as the rotor receiving the external force greater than or equal to the threshold value.

13. The flying device according to claim 1, wherein the restrictor comprise an actuator.

14. The flying device according to claim 1, wherein, in a case in which the restrictor restricts the propulsion unit, the restrictor releases the restriction and changes the propulsion unit to the closed state just before receiving the external force.

15. The flying device according to claim 1, wherein the flying device has a spherical shape in a case in which the propulsion unit is in the closed state.

16. The flying device according to claim 1, wherein the predetermined angle is 90 degrees.

17. A method of flying a flying device comprising a propulsion unit, the method comprising steps of:
restricting the propulsion unit in an open state from rotating more than a predetermined angle during flight of the flying device, the propulsion unit in the open state being rotated from a closed state by the predetermined angle; and
releasing a restriction.

18. A recording medium which stores a program executed to instruct a computer of a flying device comprising a propulsion unit, to control:
a restrictor which (i) restricts the propulsion unit in an open state from rotating more than a predetermined angle during flight of the flying device, the propulsion unit in the open state being rotated from a closed state by the predetermined angle and (ii) releases a restriction on the propulsion unit.

* * * * *